US011370564B2

(12) United States Patent
Jiang et al.

(10) Patent No.: US 11,370,564 B2
(45) Date of Patent: Jun. 28, 2022

(54) ADJUSTABLE INTERNAL SUPPORT RESTRAINT DEVICE FOR ROUNDNESS CONTROL OF CABIN COMPONENT

(71) Applicant: Harbin Institute of Technology, Harbin (CN)

(72) Inventors: Jiantang Jiang, Harbin (CN); Hao Jiang, Harbin (CN); Yong Yuan, Harbin (CN); Wenzhu Shao, Harbin (CN); Liang Zhen, Harbin (CN)

(73) Assignee: Harbin Institute of Technology, Heilongjiang (CN)

( * ) Notice: Subject to any disclaimer, the term of this patent is extended or adjusted under 35 U.S.C. 154(b) by 0 days.

(21) Appl. No.: 17/167,079

(22) Filed: Feb. 4, 2021

(65) Prior Publication Data

US 2021/0362880 A1 Nov. 25, 2021

(30) Foreign Application Priority Data

May 25, 2020 (CN) .......................... 202010448162.7

(51) Int. Cl.
*B29C 33/48* (2006.01)
*B64F 5/10* (2017.01)
*B21D 3/00* (2006.01)
*B21D 7/03* (2006.01)

(52) U.S. Cl.
CPC ................. *B64F 5/10* (2017.01); *B21D 3/00* (2013.01); *B21D 7/03* (2013.01)

(58) Field of Classification Search
CPC . B21D 7/02; B21D 7/022; B21D 7/04; B21D 11/10; B21D 11/203; B21D 11/22; B21D 53/92; B21D 3/00; B21D 7/03; B64F 5/10; B64G 1/22
See application file for complete search history.

(56) References Cited

U.S. PATENT DOCUMENTS

| 3,583,200 A * | 6/1971 | Cvijanovic | B21D 41/02 72/393 |
| 2006/0231682 A1* | 10/2006 | Sarh | B64C 1/068 244/119 |
| 2006/0284047 A1* | 12/2006 | Spishak | B64F 5/10 248/637 |

* cited by examiner

*Primary Examiner* — Jun S Yoo
(74) *Attorney, Agent, or Firm* — CRGO Global; Steven M. Greenberg

(57) ABSTRACT

Disclosed is an adjustable internal support restraint device for roundness control of a cabin component. The present disclosure solves the problem that the existing cabin components are prone to roundness distortion in a heat treatment process. The adjustable internal support restraint device includes a central limiting column and at least two circumferential ejecting correcting assemblies that are coaxially mounted on the central limiting column in a sleeving manner. Each circumferential ejecting correcting assembly includes a mounting piece and a plurality of ejector blocks. The mounting piece is mounted on the central limiting column in a sleeving manner. The plurality of the ejector blocks are annularly arranged outside the mounting piece and are in threaded connection with the mounting piece. One side surface, close to the inner cavity profile of a cabin, of each ejector block and the inner cavity profile of the cabin are arranged according to the shapes.

15 Claims, 2 Drawing Sheets

ADJUSTABLE INTERNAL SUPPORT RESTRAINT DEVICE FOR ROUNDNESS CONTROL OF CABIN COMPONENT

CROSS REFERENCE TO RELATED APPLICATIONS

This application claims priority under 35 U.S.C. ¬ß119(a) to Chinese patent application 202010448162.7 filed on May 25, 2020, the entire teaching of which is incorporated herein by reference.

BACKGROUND OF THE INVENTION

Field of the Invention

The present disclosure relates to an adjustable internal support restraint device for roundness control of a cabin component, belonging to the technical field of manufacturing deformation control.

Description of the Related Art

Aluminum alloys and magnesium alloys are widely used in aerospace components to achieve the design objective of high strength and light weight due to their excellent specific stiffness and specific strength. Cabin components are main load bearing components in aerospace equipment, and are the places where the magnesium alloys and the aluminum alloys are used intensively. In the current manufacturing process, blanks of the cabin components are mostly manufactured by a casting process, and structures and properties are adjusted and controlled by heat treatment to meet the mechanical requirements required by a design; after the completion of the heat treatment, the blanks are machined to complete final forming and manufacturing. As described above, cabin blanks are subjected to the processes, such as casting and heat treatment, before putting into a machining process, so the process is complex and the thermal history is complex, thus the cabin blanks deform easily in a manufacturing process. Statistics show that the deformation of the aluminum alloy and magnesium alloys cabin components are mainly manifested as the change of roundness during casting annealing or solution-quenching. When such deformation occurs in a cabin, the problems, such as inconsistent circumferential cutting amount and uneven thickness of a finished cabin, will be caused in a machining process of the cabin. When the deformation is serious, it may even lead to the damage of components in the machining process, thereby resulting in the scrapping of products. In recent years, the specification and structural complexity of the cabin components increase rapidly, and the deformation problem in the manufacturing process becomes more and more prominent, which seriously affects the manufacturing and use of such components.

A large number of trial production practice shows that the problem of the roundness change of the components cannot be solved only by adjusting a heat treatment process. In particular, for the castings that change immediately after sanding treatment, if an externally applied load is not introduced for correction, then the deformation of cast blanks cannot be eliminated; on the other hand, there is no effective control and correction means for the roundness change induced by solution-quenching. Therefore, the introduction of an appropriate constraint system for shape control/correction of the components in the heat treatment process becomes an inevitable choice for the roundness control of the cabin components, where how to realize circumferential and controllable loading of a selected area becomes the key of a constraint control technology.

Therefore, the design of an appropriate restraint device with respect to the roundness control/correction problem of the cabin components becomes an important technical link in a roundness control technical system for the components. The design and use of this type of constraint structures are helpful to solve the difficult problem of roundness distortion of the cabin components, which is expected to provide powerful support for accurate manufacturing of the cabin components.

BRIEF SUMMARY OF THE INVENTION

The present disclosure provides an adjustable internal support restraint device for roundness control of a cabin component to solve the problem that the existing cabin components are prone to roundness distortion in a heat treatment process.

To solve the above technical problems, the technical solution adopted by the present disclosure is that:

An adjustable internal support restraint device for roundness control of a cabin component includes a central limiting column and at least two circumferential ejecting correcting assemblies that are coaxially mounted on the central limiting column in a sleeving manner, where each circumferential ejecting correcting assembly includes a mounting piece and a plurality of ejector blocks. The mounting piece is mounted on the central limiting column in a sleeving manner. The plurality of the ejector blocks are annularly arranged outside the mounting piece and are in threaded connection with the mounting piece. One side surface, close to the inner cavity profile of a cabin, of each ejector block and the inner cavity profile of the cabin are arranged according to the shapes.

Further, the mounting piece includes a mounting ring and a plurality of support arms that are uniformly and fixedly mounted on an outer wall of the mounting ring. The number of the support arms is the same as that of the ejector blocks in each circumferential ejecting correcting assembly. The plurality of the ejector blocks are in threaded connection with the plurality of the support arms in one-to-one correspondence.

Further, the support arm comprises a cylindrical section and a threaded section that are fixedly connected end to end and are formed integrally. One end of the cylindrical section is fixedly connected to the mounting ring. The ejector block is in threaded connection with the threaded section. The threaded section, between one end of the ejector block and the other end of the cylindrical section, is in threaded connection with an eyelet bolt.

Further, the mounting ring is in clearance fit with the central limiting column.

Further, when the inner cavity profile of the cabin is a cambered surface, the ejector block is in full arc length or half arc length fit with the inner cavity profile of the cabin.

Further, the cross section of one side surface, close to the inner cavity profile of the cabin, of the ejector block is wave-shaped or square wave-shaped.

Further, the number of the support arms is four, and the four support arms are arranged pairwise in opposite directions in a manner of ejecting each other.

Further, the number of the circumferential ejecting correcting assemblies is three.

Further, the central limiting column is a hollow cylinder.

Compared with the prior art, the present disclosure has the following effects:

Through the present application, position and strength adjustable support restraint in cabin components may be realized. Restraint support may be formed at multiple positions in an inner cavity of the cabin, which effectively restrains the roundness change of the cabin components in the heat treatment process, or corrects the shapes of existing roundness change positions in the components in combination with heat treatment. The adjustable internal support restraint device for roundness control of a cabin component is suitable for large thin-walled aluminum magnesium alloy cabin components with low structural stiffness and large roundness change tendency. When combined with the heat treatment process, the roundness distortion of such components may be effectively limited/corrected, which significantly improves the yield of the components.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
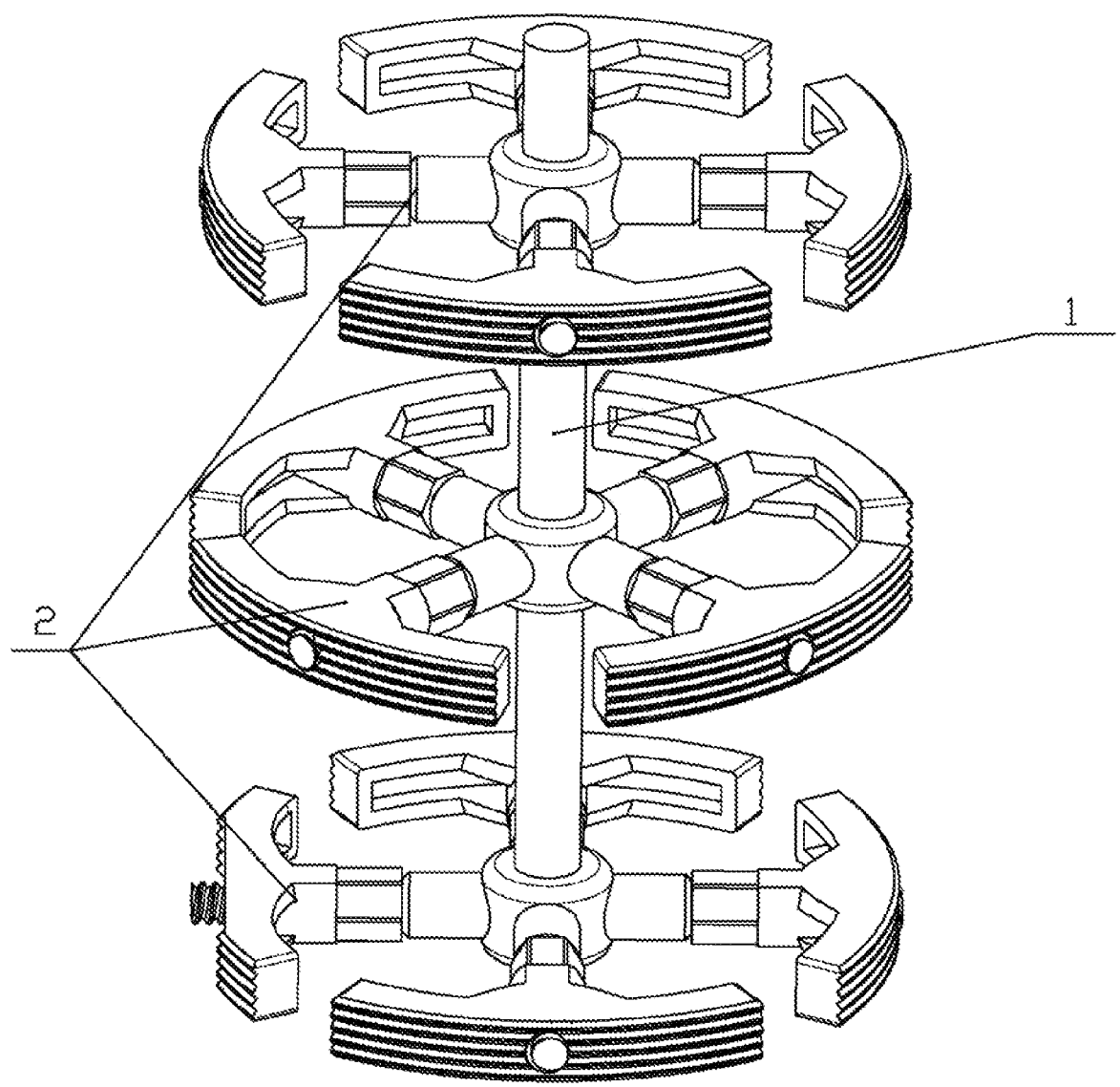
FIG. 1 is a schematic three-dimensional structural diagram of this application.
Figure 2:
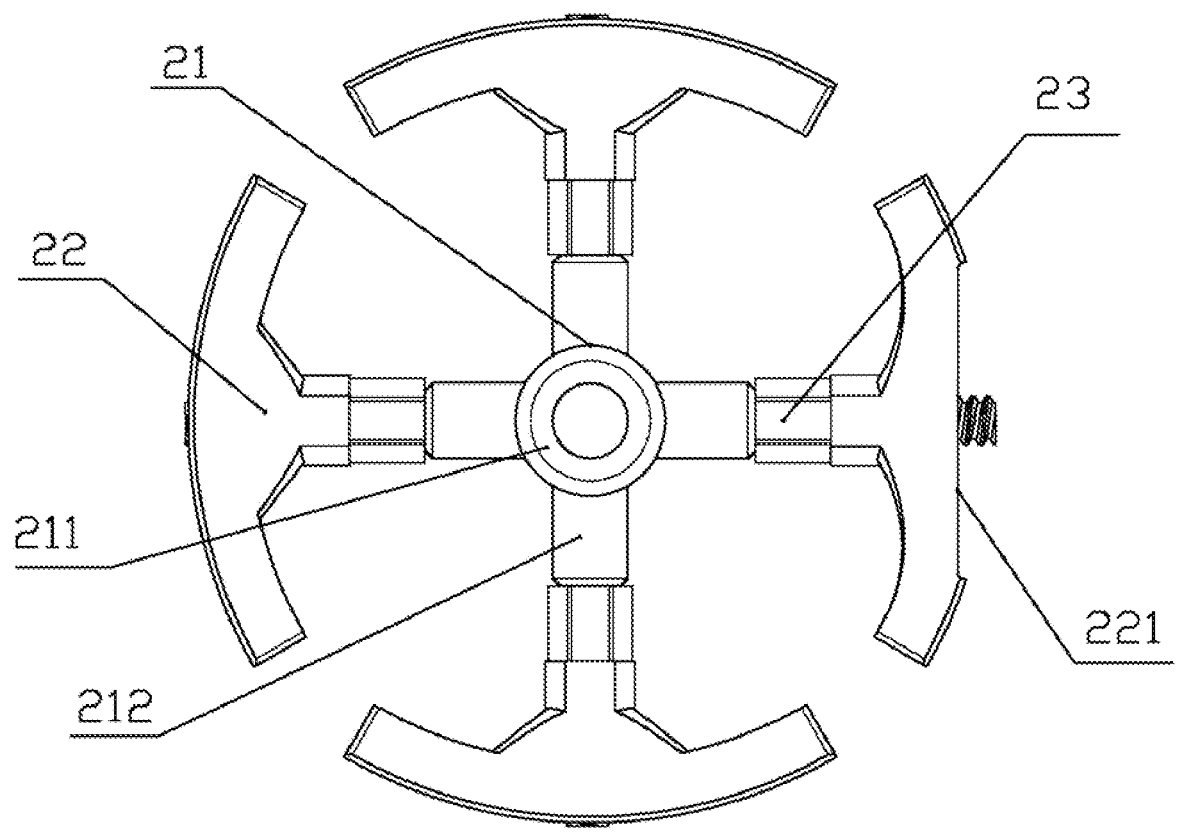
FIG. 2 is a schematic structural diagram of a circumferential ejecting correcting assembly.

Implementation manner one: the present implementation manner is described in combination with FIG. 1 to FIG. 4. An adjustable internal support restraint device for roundness control of a cabin component includes a central limiting column 1 and at least two circumferential ejecting correcting assemblies 2 that are coaxially mounted on the central limiting column 1 in a sleeving manner. Each circumferential ejecting correcting assembly 2 includes a mounting piece 21 and a plurality of ejector blocks 22. The mounting piece 21 is mounted on the central limiting column 1 in a sleeving manner. The plurality of the ejector blocks 22 are annularly arranged outside the mounting piece 21 and are in threaded connection with the mounting piece 21. One side surface, close to the inner cavity profile of a cabin, of each ejector block 22 and the inner cavity profile of the cabin are arranged according to the shape.

The threaded connection manner between the ejector blocks 22 and the mounting piece 21 makes both ejecting correcting positions and ejecting correcting loads be adjusted flexibly, so that integrated constraint support of the inner cavity of the cabin may be realized. When combined with a heat treatment process, the roundness deviation of the cabin components may be controlled with 1 percent. Moreover, the shapes of the ejector blocks 22 may be replaced or adjusted separately according to different inner cavity profile structures of the cabins. Compared with the traditional rigid constraint die, the ejector blocks 22 are simple in structure, good in adaptability, and easy to mount and adjust.

Through the present application, position and strength adjustable support restraint in the cabin components may be realized. Restraint support may be formed at multiple positions in an inner cavity of the cabin, which effectively restrains the roundness change of the cabin components in the heat treatment process, or corrects the shapes of existing roundness change positions in the components in combination with heat treatment. The adjustable internal support restraint device for roundness control of a cabin component is suitable for large thin-walled aluminum magnesium alloy cabin components with low structural stiffness and large roundness change tendency. When combined with the heat treatment process, the roundness distortion of such components may be effectively limited/corrected, which significantly improves the yield of the components.

The mounting piece 21 includes a mounting ring 211 and a plurality of support arms 212 that are uniformly and fixedly mounted on the outer wall of the mounting ring 211. The number of the support arms 212 is the same as that of the ejector blocks 22 in each circumferential ejecting correcting assembly 2. The plurality of the ejector blocks 22 are in threaded connection with the plurality of the support arms 212 in one-to-one correspondence. In such a design, the length of the support arm 212 may be adjusted along with the inside diameter of the cabin according to the shape to adapt to roundness control of the cabin components with different inside diameters.

The support arm 212 includes a cylindrical section and a threaded section that are fixedly connected end to end and are formed integrally. One end of the cylindrical section is fixedly connected to the mounting ring 211. The ejector block 22 is in threaded connection with the threaded section. The threaded section, between one end of the ejector block 22 and the other end of the cylindrical section, is in threaded connection with an eyelet bolt 23. In such a design, the rotation of the eyelet bolt 23 may drive the support arm 212 to extend and retract in the radial direction, that is the eyelet bolt 23 is rotated in to drive the ejector block 22 to displace to realize loaded ejecting correcting and load-maintained constraint of a selected position of the inner cavity of the cabin. The fixed connection manner between the support arms 212 and the mounting ring 211 may be threaded connection or welding. The eyelet bolts 23 are high temperature resistant and high strength bolts.

The mounting ring 211 is in clearance fit with the central limiting column 1. In such a design, axial sliding and circumferential rotation of the circumferential ejecting correcting assembly 2 on the central limiting column 1 may be realized so as to realize the adjustment of the axial positions and the circumferential positions of the ejector blocks 22. For example, a plurality of first positioning holes may be formed in the outer wall of the central limiting column, internal threads are formed in the first positioning holes, one or more second positioning holes are formed in the mounting ring, and the second positioning holes may be either unthreaded holes or threaded holes. The adjustment of the axial position or the circumferential position of the mounting ring on the central limiting column is realized through positioning columns provided with external threads, the first positioning holes and the second positioning holes. The adjustment manner of the mounting ring on the central limiting column is not limited to this.

When the inner cavity profile of the cabin is a cambered surface, the ejector block 22 is in full arc length or half arc length fit with the inner cavity profile of the cabin.

The cross section of one side surface, close to the inner cavity profile of the cabin, of the ejector block 22 is wave-shaped or square wave-shaped.

The number of the support arms 212 is four, and the four support arms are arranged pairwise in opposite directions in a manner of ejecting each other.

The number of the circumferential ejecting correcting assemblies 2 is three.

The central limiting column 1 is a hollow cylinder.

Implementation manner two: the present implementation manner is described in combination with FIG. 1 to FIG. 4. The central limiting column 1 has the diameter of 25 mm and the length of 430 mm, and is machined by using high temperature resistant die steel. Three circumferential ejecting correcting structures are respectively and correspondingly mounted at the positions, 62 mm away from the end parts, of the two ends and the middle position of the central limiting column by using clearance fit. Where, the upper circumferential ejecting correcting structure and the lower circumferential ejecting correcting structure are arranged in an aligned manner. The middle circumferential ejecting correcting structure is rotated by 45 degrees around the central limiting column 1 relative to the other two circumferential ejecting correcting structures.

The support arm 212 has the diameter of 25 mm and the length of 110 mm, and is machined by using high temperature resistant die steel. External threads with the length of 80 mm are machined at one end, and are used for mounting the ejector block 22. External threads with the length of 10 mm are machined at the other end, and are used for fixedly connecting the mounting ring 211.

The mounting ring 211 has the inside diameter of 25 mm, the outside diameter of 50 mm, and the height of 35 mm, and is machined by using high temperature resistant die steel. Threaded holes are machined in 90-degree symmetrical distribution, and are used for mounting the support arms 212.

The eyelet bolts 23 use M20 high strength bolts.

Figure 3:
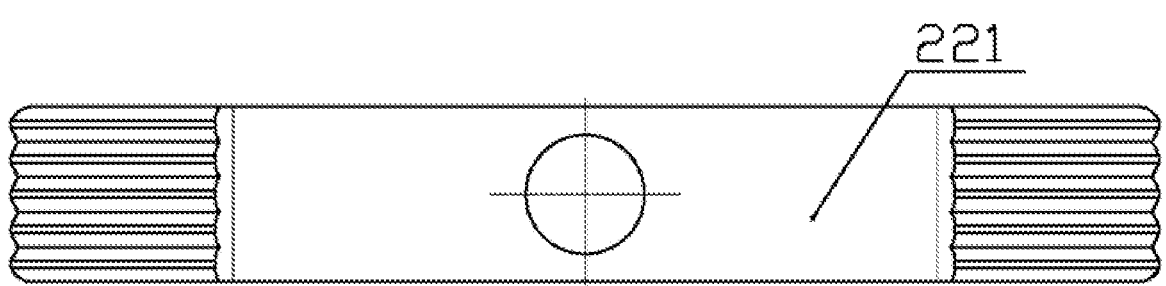
FIG. 3 is a schematic structural diagram of a partial fitting surface of an ejector block.
Figure 4:
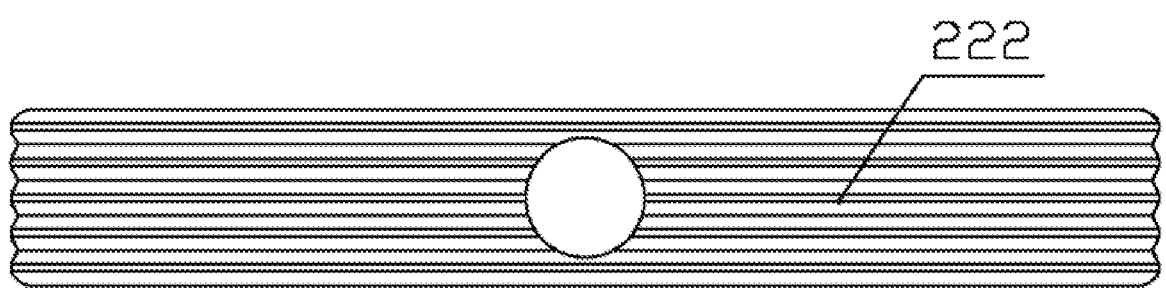
FIG. 4 is a schematic structural diagram of a full arc length fitting surface of the ejector block.

The ejector blocks 22 are T-shaped block bodies, have the thickness of 25 mm, and are machined by using high temperature resistant die steel. A square wave-shaped cambered surface with the radian less than 3 percent is machined on the outer edge of the ejector block 22, and is used in full arc length fit or partial fit with the inner cavity profile of the cabin. Threaded holes are machined in the centers of the ejector blocks 22, and are used for mounting the ejector blocks 22 on the support arms 212. Where, a partial fit or full arc length fit manner may be adopted according to the inner cavity profiles of the cabins. For example, the structure of a partial fitting surface 221 of the ejector block 22 is as shown in FIG. 3, and the structure of a full arc length fitting surface 222 is as shown in FIG. 4.

The fitting surface of the ejector block 22 may be regular wave-shaped.

All of the number, the axial arrangement position, the circumferential arrangement position, the fitting surface profile radians, and the like of the ejecting correcting structures may be flexibly adjusted along with the changes of the structures and the sizes of the cabins. Other components and connection relationships are the same as those of the implementation manner one.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. An adjustable internal support restraint device for roundness control of a cabin component, comprising a central limiting column and at least two circumferential ejecting correcting assemblies that are coaxially mounted on the central limiting column in a sleeving manner, wherein each circumferential ejecting correcting assembly includes a mounting piece and a plurality of ejector blocks;
the mounting piece is mounted on the central limiting column in a sleeving manner; the plurality of the ejector blocks are annularly arranged outside the mounting piece and are in threaded connection with the mounting piece; and
one side surface, close to the inner cavity profile of a cabin, of each ejector block and the inner cavity profile of the cabin are arranged according to the shapes;
wherein the mounting piece comprises a mounting ring and a plurality of support arms that are uniformly and fixedly mounted on an outer wall of the mounting ring; the number of the support arms is the same as that of the ejector blocks in each circumferential ejecting correcting assembly; the plurality of the ejector blocks are in threaded connection with the plurality of the support arms in one-to-one correspondence; and
wherein the support arm comprises a cylindrical section and a threaded section that are fixedly connected end to end and are formed integrally; one end of the cylindrical section is fixedly connected to the mounting ring; the ejector block is in threaded connection with the threaded section; the threaded section, between one end of the ejector block and the other end of the cylindrical section, is in threaded connection with an eyelet bolt.

2. The adjustable internal support restraint device for roundness control of a cabin component according to claim 1, wherein the mounting ring is in clearance fit with the central limiting column.

3. The adjustable internal support restraint device for roundness control of a cabin component according to claim 2, wherein when the inner cavity profile of the cabin is a cambered surface, the ejector block is in full arc length or half arc length fit with the inner cavity profile of the cabin.

4. The adjustable internal support restraint device for roundness control of a cabin component according to claim 3, wherein the cross section of one side surface, close to the inner cavity profile of the cabin, of the ejector block is wave-shaped or square wave-shaped.

5. The adjustable internal support restraint device for roundness control of a cabin component according to claim 3, wherein the number of the circumferential ejecting correcting assemblies is three.

6. The adjustable internal support restraint device for roundness control of a cabin component according to claim 5, wherein the central limiting column is a hollow cylinder.

7. The adjustable internal support restraint device for roundness control of a cabin component according to claim 1, wherein the mounting ring is in clearance fit with the central limiting column.

8. The adjustable internal support restraint device for roundness control of a cabin component according to claim 7, wherein when the inner cavity profile of the cabin is a cambered surface, the ejector block is in full arc length or half arc length fit with the inner cavity profile of the cabin.

9. The adjustable internal support restraint device for roundness control of a cabin component according to claim 8, wherein the cross section of one side surface, close to the inner cavity profile of the cabin, of the ejector block is wave-shaped or square wave-shaped.

10. The adjustable internal support restraint device for roundness control of a cabin component according to claim 8, wherein the number of the circumferential ejecting correcting assemblies is three.

11. The adjustable internal support restraint device for roundness control of a cabin component according to claim 1, wherein the cross section of one side surface, close to the inner cavity profile of the cabin, of the ejector block is wave-shaped or square wave-shaped.

12. The adjustable internal support restraint device for roundness control of a cabin component according to claim 11, wherein the number of the support arms is four, and the four support arms are arranged pairwise in opposite directions in a manner of ejecting each other.

13. The adjustable internal support restraint device for roundness control of a cabin component according to claim 1, wherein the number of the circumferential ejecting correcting assemblies is three.

14. The adjustable internal support restraint device for roundness control of a cabin component according to claim 13, wherein the central limiting column is a hollow cylinder.

15. The adjustable internal support restraint device for roundness control of a cabin component according to claim 1, wherein the central limiting column is a hollow cylinder.

\* \* \* \* \*